United States Patent
d'Alayer de Costemore d'Arc

[19]

[11] Patent Number: 5,956,310
[45] Date of Patent: Sep. 21, 1999

[54] DISC STORAGE AND TRANSFER APPARATUS

[75] Inventor: Stephane M. A. d'Alayer de Costemore d'Arc, Genappe, Belgium

[73] Assignee: Staar S.A., Bruxelles, Belgium

[21] Appl. No.: 08/857,487

[22] Filed: May 16, 1997

[30] Foreign Application Priority Data

Jun. 5, 1996 [BE] Belgium ................................ 96 00507

[51] Int. Cl.⁶ .................................................. G11B 33/02
[52] U.S. Cl. ........................................ 369/77.1; 369/75.2
[58] Field of Search ............................... 369/77.1, 77.2, 369/75.1, 75.2; 360/99.06; 312/9.9, 9.15, 9.17, 9.18, 9.24, 9.26, 9.28

[56] References Cited

U.S. PATENT DOCUMENTS

| | | | |
|---|---|---|---|
| 2,453,399 | 11/1948 | Baker et al. ................................ | 312/15 |
| 3,102,635 | 9/1963 | Werwin et al. ............................. | 206/62 |
| 3,316,039 | 4/1967 | Drobny ...................................... | 312/20 |
| 4,510,591 | 4/1985 | Schatteman ............................ | 369/77.1 |
| 4,589,101 | 5/1986 | Schatteman et al. ..................... | 369/38 |
| 4,647,117 | 3/1987 | Ackeret .................................... | 312/12 |
| 4,664,454 | 5/1987 | Schatteman et al. ..................... | 312/13 |
| 4,682,320 | 7/1987 | D'Alayer De Costemore D'Arc .. | 369/77.1 |
| 4,702,533 | 10/1987 | Seifert ...................................... | 312/12 |
| 4,728,157 | 3/1988 | David, Jr. .................................. | 312/12 |
| 4,770,474 | 9/1988 | Ackeret .................................... | 312/13 |
| 4,875,578 | 10/1989 | Nehl ......................................... | 206/309 |
| 5,163,040 | 11/1992 | Hake ........................................ | 369/204 |
| 5,366,073 | 11/1994 | Turrentine et al. ...................... | 206/309 |

FOREIGN PATENT DOCUMENTS

| | | |
|---|---|---|
| 3728113 | 3/1989 | Germany . |
| 589187 | 6/1947 | United Kingdom . |
| 9316471 | 8/1993 | WIPO . |

*Primary Examiner*—Stuart S. Levy
*Assistant Examiner*—Kenneth W. Fields
*Attorney, Agent, or Firm*—Leydig, Voit & Mayer, Ltd.

[57] ABSTRACT

A housing with one or more compartments for storage of discs, and a disc transfer mechanism mounted in each compartment including a mobile disc support mounted for rolling movement between inside and outside the compartment to transfer a disc in a transfer plane extending through the compartment, between a position wherein the disc is located entirely within the compartment and a position wherein a portion of the disc or the entire disc is located outside the compartment in front of a front wall, the mobile disc support including a disc support member which has elements locating or holding the disc relative to the disc support member during disc transfer and a segment presenting a curved outer edge which is maintained in rolling contact with an inner edge of a lateral member carried on a side wall of the compartment as the mobile disc support rolls without sliding to transfer a disc between its positions. The disc transfer mechanism can be combined with a disc player or recorder apparatus.

36 Claims, 4 Drawing Sheets

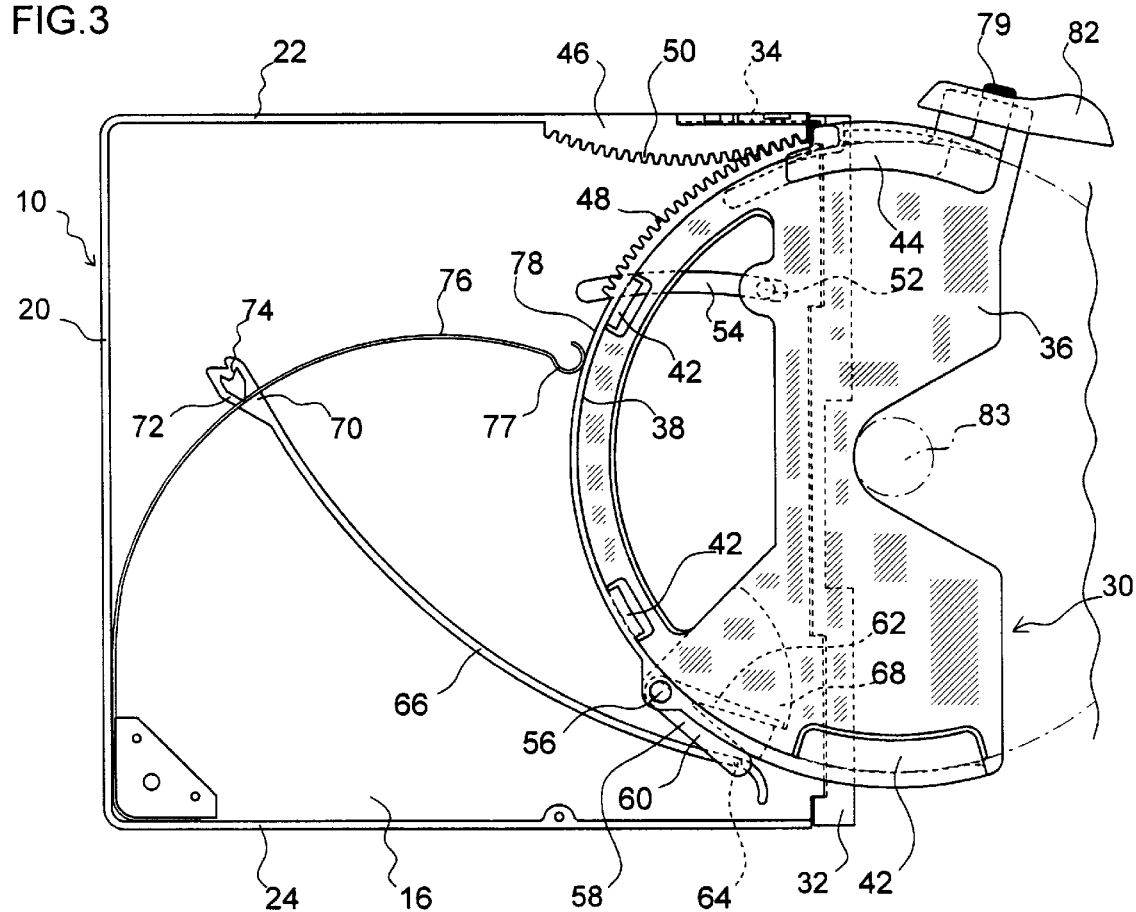

DISC STORAGE AND TRANSFER APPARATUS

FIELD OF THE INVENTION

The present invention relates to apparatus for storage and transfer of recorded-information supports, such as compact discs and optical/magnetic discs, which are properly stored and handled with a minimum of contact with their recorded surfaces so as to maintain the surfaces free of scratches, finger prints, or foreign matter such as dust, to avoid affecting information playback and/or recording quality. More particularly, the invention relates to storage and transfer apparatus for discs which allow proper handling of discs by the user and are appropriate for use in applications which require a compact apparatus to load and unload discs as in disc storage boxes and magazines, loading/unloading mechanisms and disc changers for player/recorder units, and for applications where a user either cannot directly access the storage apparatus, or cannot easily manipulate the storage apparatus to gain access to the discs, to overcome a problem faced by disabled persons and by drivers of cars when the driver cannot use both hands or cannot look at the storage device without diverting attention from driving the car.

BACKGROUND

Storage devices for discs include single-compartment crystal boxes for CD discs which lock a disc by means entering its center-hole when in storage position within the compartment and induce a user to pick it up to remove it from the box by its periphery and/or its center hole in order to avoid any contact with the CD disc surfaces after the box cover is pivoted to open the box. These boxes, however, are bulky and require a large space for the opening of the covers; furthermore, as they necessitate the use of both hands, they are not very easy to use and not appropriate at all when being handled by car-drivers to extract discs for car CD players.

Other storage and player/recorder units more particularly designed for car use, which are of the so-called "drawer" type, only allow the discs to protrude by a very limited distance, thus forcing the user to grasp the discs between thumb and forefinger which results in undesirable contact with the disc surfaces, which cannot be avoided. A typical example of such devices is disclosed in German Patent 37 28 113 C2.

A device which allows the disc to protrude to a greater extent outside the storage compartment to facilitate pick-up is disclosed in UK 589.187, but its size is bulky due to the pivoting movement of the disc support, which bulky size is a disadvantage because of the limited space available in many applications.

Commonly assigned U.S. Pat. No. 4,664,454 discloses a storage device which is more compact than the above-mentioned devices but the disc must be inserted in a skewed way and this is not always easy or appropriate because the required space is not always available where the device is to be installed.

SUMMARY OF THE INVENTION

The main object of the invention is to provide storage and transfer apparatus for discs which includes a disc transfer mechanism which transfers discs from a position entirely inside a compartment of a housing and a loading/pick-up position where a major portion of or the entire disc is located outside the compartment.

A related object is to provide a disc transfer mechanism which operates to cause at least a major portion of the disc to protrude from the compartment when the disc is in a loading/pick-up position and thereby induces the user, where the transfer mechanism is incorporated in a manual apparatus, to grip the disc without contacting or touching the disc surfaces, allowing the user to handle the disc by its periphery and/or center hole.

Another object is to provide a disc transfer mechanism which may be used in manual apparatus or powered apparatus to transfer discs between inside and outside compartments of a magazine which may be used for storage or as a component of a disc changer unit.

Another object is to provide a disc transfer mechanism which has a mobile disc support that rolls without sliding, that is, both rotates and translates, between inside and outside a housing compartment thereby allowing disc apparatus to be more compact and reducing its overall size.

A related object is to provide a disc transfer mechanism which has a mobile disc support that rolls without sliding between inside and outside a housing compartment to minimize friction between operating elements and permit construction with light plastic and/or metal parts having low inertia during operation, allowing easy manual operation in manual apparatus and requiring low amounts of energy to operate in either manual apparatus or powered apparatus.

Another object is to provide a disc transfer mechanism wherein a disc, when in the compartment, is locked against movement due to shock or vibration, is securely held during the transfer operation, and is released when outside the compartment in a loading/pick-up/operative position. A related object is to provide a disc transfer mechanism which operates in a smooth, self-controlled manner during disc transfer operations.

Another object of the invention is to provide a disc transfer mechanism which is suitable for single compartment disc storage units and provides a storage unit for a single CD having many advantages over a crystal CD box when used individually or in a stack of boxes, is also suitable for loading/unloading single CD recorder/player components, and is further suitable for multiple compartment storage units and provides a magazine-type storage unit for a plurality of discs having many advantages over available magazines for disc storage and in such applications as disc changers for CD disc or optical/magnetic disc recorder/player components.

Thus, to achieve the foregoing and other objects, according to the invention a disc transfer apparatus is provided which comprises a housing defining one or more compartments having peripheral walls; and a disc transfer mechanism mounted in each compartment including a mobile disc support mounted for rolling movement between inside and outside the compartment to transfer a disc in a transfer plane between a position wherein the disc is located entirely within the compartment and a position wherein a portion of the disc or the entire disc is located outside the compartment in front of a front wall, the transfer plane extending through the compartment, the mobile disc support including a disc support member which includes elements locating or holding the disc relative to the disc support member during disc transfer, the disc support member having a segment presenting a curved outer edge which is maintained in rolling contact with an inner edge of a lateral member carried adjacent a side wall of the compartment as the mobile disc support rolls without sliding to transfer a disc between its positions.

BRIEF DESCRIPTION OF THE DRAWINGS

Other objects and advantages will be apparent from the following description of preferred embodiments of the invention, taken in conjunction with the accompanying drawings, in which:

FIG. 3 is similar to FIG. 1 with the disc transfer mechanism and a disc in pick-up/loading position protruding outside the compartment in the housing;

FIG. 10 is a fragmentary sectional view taken in the plane of lines 10—10 in FIG. 9; and FIG. 11 is a fragmentary sectional view taken in the plane of lines 11—11 in FIG. 9.

DETAILED DESCRIPTION

DISC STORAGE BOX OR MAGAZINE (FIGS. 1–5)

Figure 1:
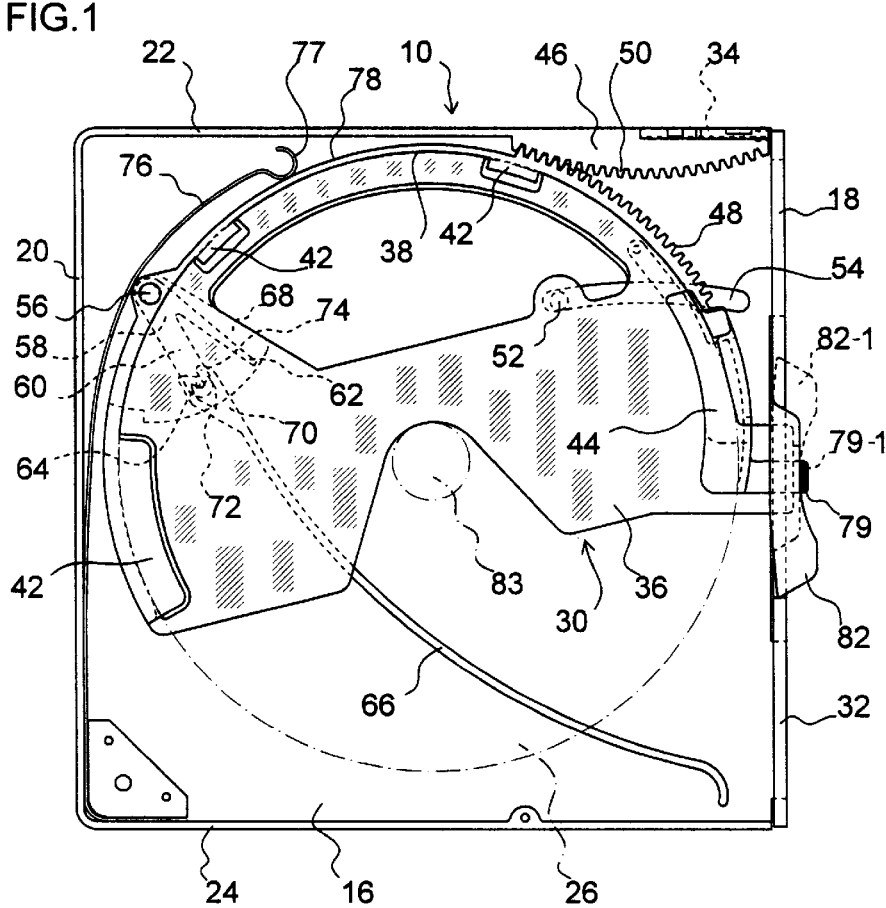
FIG. 1 is a top view of a first embodiment of the invention incorporated in a disc transfer mechanism in a housing, which may be formed with a single compartment for a single disc or with multiple compartments to provide a magazine for a plurality of discs, with a disc in storage position and the top cover of the housing removed to expose the disc and disc transfer mechanism in one compartment.
Figure 2:
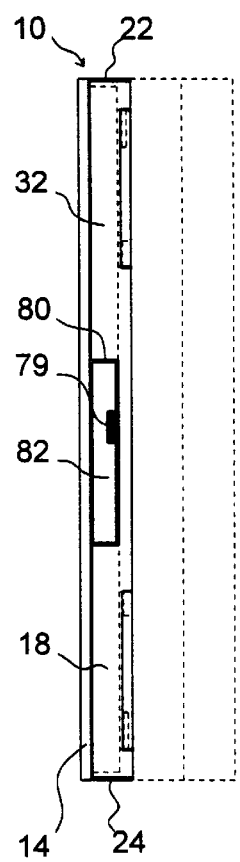
FIG. 2 is a right side view of the embodiment shown in FIG. 1 with the housing cover in place, and shows that the disc transfer mechanism of this embodiment is incorporated in each compartment of a storage box or magazine having, for purposes of illustration, two compartments illustrated in dashed lines adjacent one compartment shown in solid lines.

Referring to FIGS. 1–3, in a first embodiment the invention is incorporated in a disc transfer apparatus mounted in a housing having one compartment for a single disc or multiple adjacent compartments for storage of a plurality of discs. In either case, according to the invention, a disc transfer mechanism is provided in each compartment which locks a disc in a storage position and which is operable to transfer a disc to a pick-up/loading position outside the compartment from where it may be removed manually. When incorporated in a single compartment housing, the invention provides a disc storage unit like a crystal CD box yet requiring considerably less overall volume; when incorporated in a multiple compartment housing the invention provides a magazine of adjacent compartments affording ready access to each of a plurality of discs and replacing a stack of boxes which are difficult to store, handle and open to access the discs.

Figure 4:
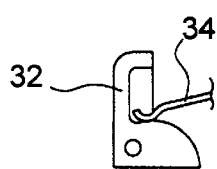
FIG. 4 is an enlarged fragmentary view illustrating the pivotable door of a compartment and spring latch for the door.

For illustration, a housing 10 defining an internal compartment is shown in solid lines in FIGS. 1–3 with a many-compartment housing being shown in dashed lines in FIG. 2, each compartment being almost parallelepipedic in shape, and the housing having top and bottom walls 14,16 in parallel planes, with lateral walls 18,20,22,24 forming the periphery of the compartment. The top wall 14 is shown to be removable and is removed in FIG. 1 to expose a disc (in dashed lines) and disc transfer mechanism 30 in one compartment. In a multiple compartment magazine internal walls and other members may also be provided for structural support and the top wall 14 of one compartment may be common to the bottom wall 16 of an adjacent compartment. The front lateral wall 18 of the housing 10 is provided with a door 32 (FIG. 4) for each compartment which is pivotally mounted to open and allow insertion of a disc and transfer of a disc by the disc transfer mechanism 30 from a storage position (FIG. 1) to a loading/pick-up position (FIG. 3). The door 32 is held in closed position by resilient means herein shown as a spring 34 (FIG. 4).

In carrying out the invention, the disc transfer mechanism 30 comprises a mobile support member 36 which has a partially circular shape in the form of a sector of approximately 250 degrees with a rim or arch 38 having an internal edge which, in the illustrated embodiment, has the same curvature as a disc.

Fixed elements 42, along the internal edge of the rim 38, and varying in specific shape, keep the periphery of the disc pressed against the upper surface of the mobile support member 36, which is preferably dished or concave-shaped (as viewed from the edge) as described in U.S. Pat. No. 4,510,591, 'to prevent any contact between the mobile support member 36 and the surface of the disc except at its periphery. A flexible leg 44, positioned laterally and flexing with respect to the mobile support member 36, cooperates with the periphery of a disc to press it against the internal edge of the rim 38 of the support member 36 in order to lock the disc in storage position and secure it against movement from shock or vibration.

Further in carrying out the invention, the mobile support member 36 of the disc transfer mechanism 30 is carried so as to be movable to transfer a disc between the disc storage position and the disc loading/pick-up position outside the compartment. To this end, the mobile support member 36 engages as it moves and cooperates with a longitudinally extending lateral member 46 on a side wall 22 of the compartment, via gear teeth 48 formed on a portion of the external edge of the arch or rim 38 of the mobile support member 36 which mesh with gear teeth 50 on the lateral member 46. In the most preferred form shown in FIG. 1, the lateral member 46 is integral with the side wall 22 of the compartment and has a curved profile and the portion of the external edge of the rim 38 of the mobile support member 36 is circular so that the external edge of the mobile support member 36 is maintained in rolling contact without sliding on the lateral member 46 of the side wall 22 of the compartment as the mobile support member 36 moves between the disc storage inside position of FIG. 1 and the disc loading /pick-up outside position of FIG. 3.

To guide the mobile support member 36 in its rolling movement and to maintain the gears 48,50 in mesh, the support member 36 bears a stud 52 on its lower surface which is guided by a surface of a short first slot or groove 54 provided in the bottom wall 16 of the compartment, and it bears at its periphery a shaft 56 around which pivots a fork 58 having two prongs 60,62 which cooperate respectively with an element on the bottom wall 16 and the surface of the mobile support member 36. Thus, the first prong 60 bears a pin 64 which is guided by a surface of a second long slot or groove 66 in the bottom wall 16 of the compartment; the second prong 62 is flexible and cooperates with the edge of a depression 68 within the lower surface of the mobile support member 36. The left extremity (FIG. 3) of the long groove 66 has a particular shape which is formed by two branches 70,72 interconnected by a notched leg 74; the notched leg 74 serves as a ratchet to lock the pin 64 and thus the mobile support member 36 in the disc storage position shown in FIG. 1; one branch 70 leads the pin 64 to the notched leg 74 and the other branch 72 guides the pin 64 back to the long groove 66 to let the mobile support member 36 undergo the action of resilient means such as a leaf-spring 76, which has a rounded extremity 77 that abuts against the non-geared portion 78 of the external edge of the rim 38 and a fixed extremity that is fixed at the corner of the lateral back and side walls 20,24 of the compartment.

When a disc is secured in the storage position, all the elements are in the stable position shown in FIG. 1. An extremity 79 of the flexible push-button leg 44 is pushed by the periphery of the disc outside the housing 10 and protrudes from the edge of the mobile support member 36 through an opening 80 in the door 32, thereby indicating in a visual and tactile way the presence of a disc within the compartment without any contact with its information-bearing surfaces.

To open the compartment and cause the disc transfer mechanism 30 to begin transfer of a disc from its storage position, the user slightly pushes the outer edge of the push-button leg 44, which serves as a control button 82, which moves it inward and pivots the mobile support member 36 slightly against the resistance of the leaf spring 76 and causes the pin 64 to clear the ratchet-notch in the leg 74 of the groove 66, travel through the branch 72 and enter the main portion of the long groove 66. Under the action of the leaf spring 76, the mobile support member 36 starts to roll toward the outside of the compartment in the housing 10 and first pivots the door 32 open against the door-spring 34 and then continues to roll through the open door, being controlled in its rolling movement by the meshed gear teeth 48,50 on the external edge of the rim 38 and the fixed lateral wall member 46.

Simultaneously, the profile of the long groove 66 guides the pin 64 laterally to pivot the fork 58 clockwise (FIG. 3). Preferably, this pivotal movement of the fork 58 around the shaft 56 is resisted frictionally to avoid the mobile support member 36 speeding up as it moves. Then, the second prong 62 which is flexible abuts against the edge of the depression 68 and is slightly deformed for further slowing down the movement of the pin 64 and thus of the mobile support member 36 to insure a gentle stop in the disc loading/pick-up position (FIG. 3) where the disc may be removed by the user. To reduce the inertia of the mobile support member 36, an aperture is provided in it.

Figure 5:
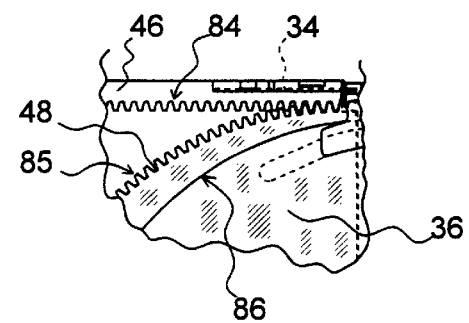
FIG. 5 is a fragmentary view illustrating an alternative linear profile for a gear adjacent an internal side wall of a disc storage compartment of the first embodiment.

As shown in FIG. 3, due to the construction and arrangement between the mobile support member 36 and the housing 10, a major portion (more than half) of the disc is located outside the housing 10 when the disc transfer mechanism 30 is in the loading/pick-up position, which allows the disc to be easily grasped by its periphery and/or center hole 83. This loading/pick-up position is provided by the curved profile of the fixed gear member 46 on the compartment wall which also allows the housing 10 to have a compact shape. While the curved profile is preferred for the longitudinally extending gear member 46, the gear member may have a linear profile 84 as shown in FIG. 5 while the curvature of the external edge 85 of the rim or arch 38 of the mobile support member 36 then deviates from the curvature of the internal edge 86.

To close the door 32 to the compartment in the housing 10, and transfer a disc to storage position within the compartment, or leave the compartment empty with no disc, the user pushes the control button 82 of the push-button leg 44 toward the inside of the housing 10 from the position shown in FIG. 3. As a result, the mobile support member 36 pivots and rolls without sliding against the action of the leaf-spring 76. At the end of the inward movement, the pin 64 which has traveled through the branch 70 engages the ratchet-notch in the cross leg 74 at the end of the long groove 66, which locks the mechanism 30 in the disc storage position (FIG. 1); the door 32 is closed by the action of the door-spring 34.

With this construction and arrangement of the housing 10 and disc transfer mechanism 30, the housing 10 is almost as compact as a storage box with a pivoting cover while not requiring the additional space above the box to open the cover. This feature is of great importance for car applications where the available space is quite restricted. Further, the compact size allows the storage compartments to be quite rigid and thus no reinforcement or specific design is required which would increase costs.

In addition, the storage compartments are thin overall and, accordingly, a greater number of them can be provided in a given volume either in a multiple-compartment magazine (dashed lines, FIG. 2) or a stack of single compartment units. As shown in FIG. 1 when in the form of a multiple-compartment magazine, control push-buttons 82,82-1 for adjacent compartments are preferably arranged offset symmetrically (right and left ones) so that they overly only in their central part to enable a user to distinguish between adjacent compartments easily.

When no disc is in a compartment, the flexible push-button leg 44, which is pivotally supported by a pin at its upper end which is connected to the mobile support member 36 inside the compartment, is not engaged by the periphery of a disc and is not pushed through the door 32 and outside the compartment. When a disc is in storage position, the protruding leg serves as an indicator of the presence of a disc in the compartment. When the leg 44 and extremity 79 are neither visible nor protruding to be felt by the user, this provides both a visual and a tactile indicator of the absence of a disc within the compartment. Such an indicator of the presence or absence of a disc is particularly advantageous for disc storage units mounted or incorporated in cars, so that the driver can by feel determine whether a disc is located in a compartment without diverting attention from driving. It is also an important advantage for use by disabled people without sight since it provides a way to determine presence or absence of a disc in a compartment entirely by touch or feel. Further, by locating the indicator of a disc within the control push-button 82,82-1 the invention allows the user to directly actuate the selected proximate control button.

In the most preferred embodiment, it has been found advantageous to use grooves 54,66 instead of slots because it has been observed that with an almost closed compartment, when the mobile support member 36 pivots toward the outside of the housing 10 a suction is produced in the space in back of the disc which causes a slow-down in the movement of the mobile disc support member 36 and the disc as they move outwardly during the transfer operation, and a positive pressure in the space as they move inwardly. It has been found, therefore, that the flexibility of the flexible second prong 62 of the fork 58 can be increased to provide a very smooth stoppage of the mobile support member 36 at its loading/pick-up position.

Figure 6:
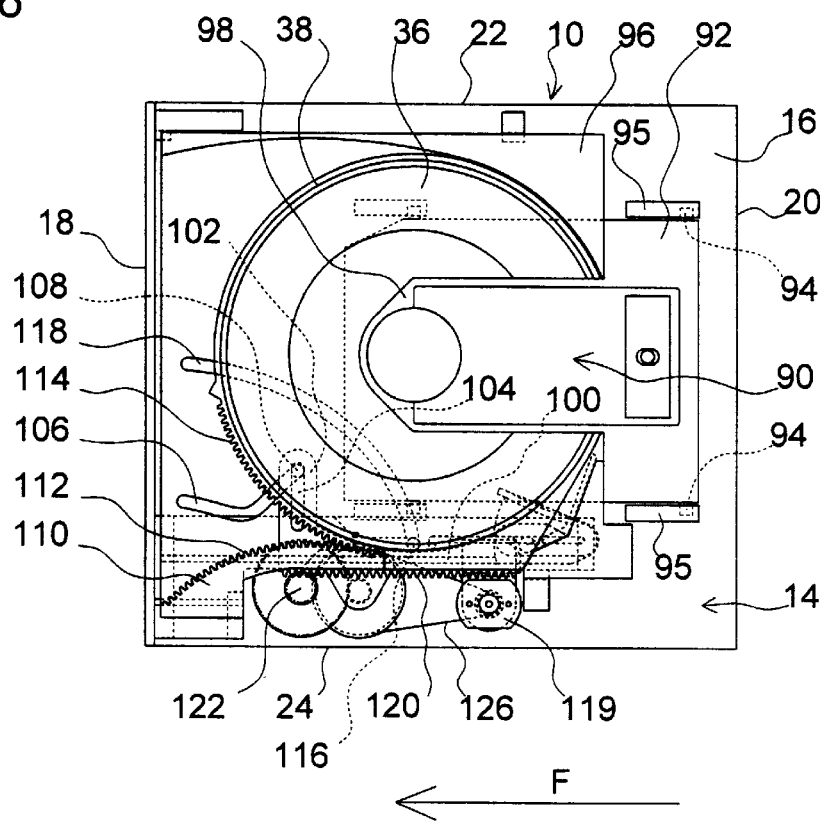
FIG. 6 is a top view of a second embodiment of the invention in which the disc transfer mechanism is combined in a housing with a recorder/player providing a loading/unloading system of the "drawer" type for a single CD or optical disc player/recorder unit.
Figure 7:
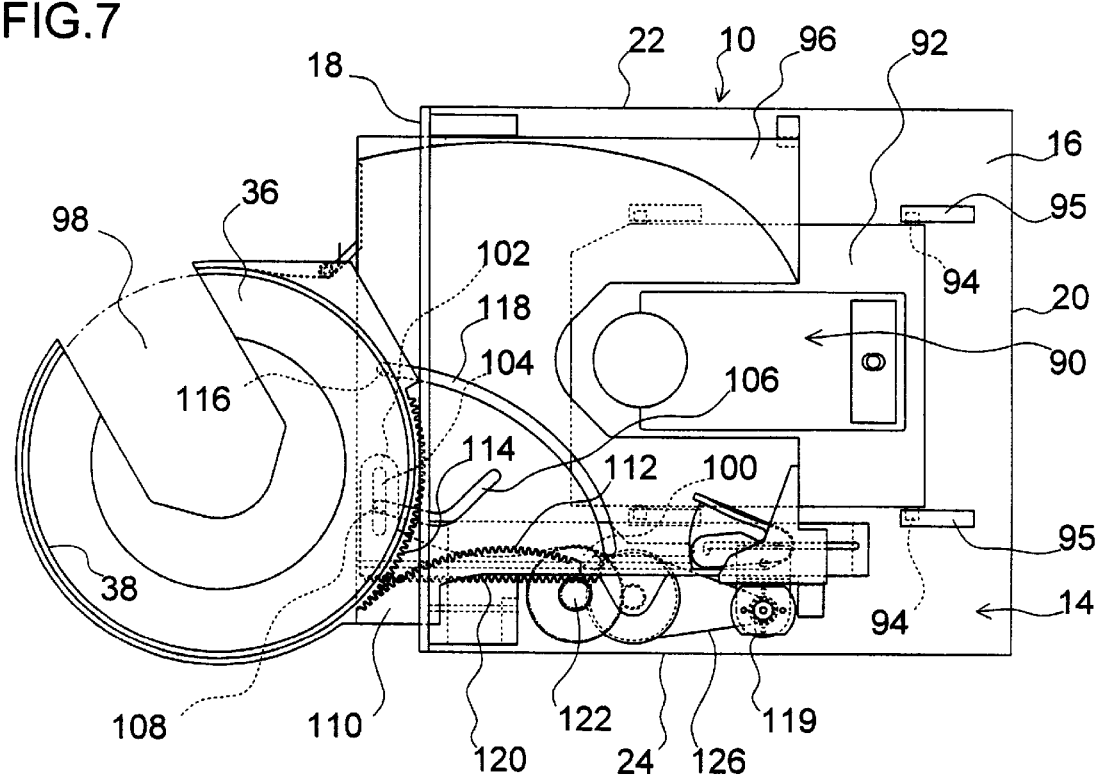
FIG. 7 is similar to FIG. 6 with the disc transfer mechanism and a disc in pick-up/loading position protruding outside the compartment in the housing.

Loading/Unloading System (FIGS. 6 and 7)

Now turning to FIGS. 6 and 7, in this particular embodiment, a disc transfer mechanism constructed according to the invention provides a disc loading/unloading system of the "drawer" type for a disc player/recorder unit suited particularly for a single CD player/recorder.

An advantage of a player/recorder unit which is equipped with a "drawer" type disc transfer mechanism according to this invention is that the unit may be more compact and the overall depth of the unit reduced compared with units with other "drawer" type loading/unloading systems, which is very important in many applications for such units, particularly in applications involving installation in small spaces such as in portable player/recorder units or in the dashboards of cars where space, in particular depth, is very limited. Other advantages common to the previously described embodiment also are provided by this embodiment, such as facilitating proper handling of discs by the user.

In this embodiment, the player/recorder unit comprises a housing 10 providing a compartment having peripheral walls top and bottom 16 in parallel planes, and a lateral front, back and sides 18,20,22,24. The top 14 in FIGS. 6 and 7 is removed to expose the components in the housing 10 which include a disc transfer mechanism having a mobile support member 36 which transfers a disc from a loading/pick-up position (FIG. 7) outside the compartment to an operative position inside the compartment on a player/recorder component 90 which is mounted on a chassis 92 inside the compartment. The player/recorder 90 has an operating means including a disc driving means and optical (laser) scanning means (which is conventional and diagrammatically illustrated to avoid complicating the drawings). The player/recorder chassis 92 is longitudinally movable in the housing 10 being carried by laterally extending pins or roller means 94 which roll or slide on upwardly inclined ramps 95 using an arrangement similar to that shown, for example, in commonly assigned U.S. Pat. No. 4,208,023 to raise and lower the operating means relative to a disc on the disc support member 36 and in the operative position of FIG. 6.

In carrying out the invention, the disc transfer mechanism is mounted on a drawer 96 which is slidably supported in the housing 10 for longitudinal movement between a position partially projecting from the housing 10 (FIG. 7) and a position (FIG. 6) entirely inside the housing. The disc support member 36 which is partially circular is supported for rolling movement without sliding relative to the drawer 96 during disc transfer operations, the movement of the disc support member 36 being in a transfer plane which extends (horizontally) into the housing 10 between and parallel with the top and bottom 14,16 of the compartment. The rolling movement of the disc support member 36 is between the operative position of FIG. 6 entirely inside the housing and the loading/pick-up position of FIG. 7 entirely outside the housing. The partially circular disc support member 36 preferably has a dished shape with a rim 38 which holds a disc against movement during transfer operations and a wide opening 98 extending radially from the center, to properly carry a disc solely adjacent its periphery during disc transfer and to permit access to a disc on the support member 36 in the operative position (FIG. 6) by the operating means of the player/recorder component 90. In keeping with the invention, to power the rolling movement of the disc support member 36 on the drawer 96 there is slidably mounted on the drawer so that it slides longitudinally, a longitudinally extending lateral slide member 100 which is carried adjacent a lateral side wall 24 of the compartment in the housing 10. The lateral slide member 100 has a transverse (vertical as viewed in the figures) leg 102 with a straight transverse drive slot 104 which intersects with a V-shaped slot 106 in the lower plate or bottom of the drawer 96 and receives a first stud 108 which is fixed to and projects below the disc support member 36. A second longitudinally extending lateral member 110 which is fixed to the drawer 96 has a curved inner edge which bears gear teeth 112. The outer edge of a curved segment of the mobile disc support 36 member also bears gear teeth 114 which mesh with the gear teeth 112 on the fixed lateral member 110 so that the curved outer edge of the mobile disc support member 36 is maintained in rolling contact without sliding with the inner edge of the lateral member 110 as the disc support member 36 moves during the disc transfer operations between the positions of FIG. 6 and FIG. 7.

To control the movement of the disc support member 36 and maintain the edge of the disc support member 36 in rolling contact with the fixed lateral member 110 as the disc support member moves, and to cause movement of both the disc support member 36 and the drawer 96 during the disc transfer operations, the disc support member 36 is provided with both the first stud 108 which travels in the transverse drive slot 104 and the short V-shaped slot or groove 108 in the lower plate of the drawer 96, and a second stud 116 which travels in a long curved slot or groove 118 also in the lower plate, as the mobile disc support member 36 moves in the disc transfer operations.

Power means such as a motor 119 is preferably provided to move the drawer 96 and the mobile disc support member 36 by power and, as an incident to movement of the drawer 96, to shift by power the player/recorder component 90 and its operating means relative to a disc on the support member 36. To this end a linear edge of the lateral slide member 100, which is slidably carried by the drawer 96 by means of cooperating pins and slide grooves or the like, is formed with gear teeth 120 to provide a rack of a rack/pinion drive. The pinion 122 of the drive is powered by the drive motor 119 through belts 126 and gears.

With the unit in the loading/pick-up position of FIG. 7 and a disc placed on the mobile disc support member 36, to carry out a loading operation, the motor 119 is operated to actuate the lateral slide member 100 via the rack and pinion drive in the inward direction (opposite to F) which causes it to roll the disc support member 36 inward relative to the drawer 96 via the transverse drive slot 104 and stud 108 connection. This inward rolling movement relative to the drawer 96 of the disc support member 36 while the gears 112,114 remain in mesh is a rotation clockwise from the loading/pick-up position of FIG. 7 toward the operative position of FIG. 6. After the disc support member 36 has been fully rotated, and the drive slot 104 and stud 108 have moved to the right-hand extremity of the V-slot 106 in the lower plate of the drawer 96 (see FIG. 6), the drawer 96 will have remained in the position shown in FIG. 7 where it projects from the housing 10. Further inward movement of the lateral slide member 100 causes the drawer 96 to move entirely inside the compartment to the position of FIG. 7 and, as in incident to this further inward movement of the drawer 96, through a connection which may be rigid or resilient, the drawer 96 causes the player/recorder chassis 92 to move longitudinally within the compartment from the position illustrated in FIG. 7 to the position illustrated in FIG. 6. Such longitudinal movement of the player/recorder chassis 92 raises the operating means of the player/recorder 90, due to the inclined ramp 95 supporting the chassis-rollers 94, such that the driving means engages the disc on the disc support member 36 and lifts the disc clear of the dished surface and rim 38 so that it may be rotated by the driving means and scanned by the laser scanning means.

In this embodiment, the disc is located in front of the front wall 18 of the housing 10 and compartment and entirely outside the compartment when the disc transfer mechanism is in the loading/pick-up position as shown in FIG. 7. In this position, a disc may be grasped by a user by its periphery and center hole without any necessity to grip it by its surfaces, thereby avoiding any undesirable contact with its recording surfaces. The location of a disc in the loading/pick-up position entirely outside the compartment of the player/recorder unit housing 10 also makes it easier for the user to place a disc in the unit or remove a disc from the unit. It also will be observed that in this embodiment the overall depth of the player/recorder unit is just slightly greater than the diameter of a disc, which is an important advantage as mentioned above.

When it is desired to unload a disc after a playing/recording operation has ended, the drive motor 119 is connected to a power source and operates to shift the lateral slide member 100 in the direction F in FIG. 6 which causes the reverse sequence of operations to that above described for the loading operation. Thus, the transverse drive slot 104 of the slider member 100 through the first stud 108 and intersecting V-shaped slot 106 causes the drawer 96 to move outward which first lowers the operating means of the player/recorder component 90 to their non-interfering positions. The disc support member 36 is then caused to roll outwardly and the disc support member 36 and drawer 96 eventually reach the loading/pick-up position of FIG. 7.

Disc Changer (FIGS. 8–11)

Further in accordance with the invention, a disc transfer mechanism constructed in keeping therewith provides a disc changer for a player/recorder unit. As disclosed in FIGS. 8–11 only one disc compartment of a multiple-compartmented magazine is represented and a very diagrammatic illustration is included of a player/recorder component as otherwise the drawings become very confusing. The player/recorder component, as in the previous embodiment of FIGS. 6,7, is entirely conventional.

The disc changer according to the invention basically comprises two main components: a disc storage magazine 130 and the player/recorder 90. The magazine 130 has a housing 10 divided into compartments 132 for a number of discs (preferably 6–12, although more compartments may be included for discs to be stored); the player/recorder 90 includes, among other elements, the disc driving means 134 and optical (laser) scanning means 136 carried on a frame 138 which is vertically movable on a fixed support component of the housing 10 with respect to the magazine 130. The frame 138 is vertically movable with respect to the disc magazine 130 so that the driving and optical scanning means 134,136 may be positioned in front of and in alignment with a selected compartment 132 in the magazine 130 and the disc to be played or recorded which is within the selected compartment 132.

The disc magazine 130 comprises disc compartments 132 mounted above one another but, as shown in FIGS. 8–11, only one representative compartment is illustrated by, for example, removing the top wall 14 of the magazine housing 130 to expose the compartment 132 and a disc therein. In keeping with the invention, each compartment 132 has a disc transfer mechanism which includes a disc support member 36 that is supported and arranged to roll without sliding in the transfer operations between a disc storage position (FIG. 8) wherein a disc is entirely within the compartment 132 and a loading/pick-up/operative position (FIG. 9) wherein the disc is located in front of the front wall 18 of the magazine housing outside the compartment 132.

To load the magazine 130, the player/recorder 90 is moved vertically to a non-interfering position which, for example, may be its lowest position, the magazine is removed from the unit and the disc support member 36 in each compartment 132 is shifted outside the respective compartment where a disc may be placed on the disc support member 36 which is then shifted inside the compartment 132. Each compartment 132 may be loaded in this manner.

After the magazine 130 is loaded with one or more discs, the player/recorder 90 may be moved vertically (preferably by powered means) to a position in horizontal alignment with a selected compartment 132 containing a disc to be played (or recorded) and the disc support member 36 is operated to transfer a disc from inside the compartment 132 to outside the compartment 132 and an operative position. When the player/recorder 90 is properly aligned with the selected compartment 132, the player/recorder 90 is then moved slightly upward by actuation of a slider 139 having inclined ramps 95 engaging studs of the player/recorder 90, which causes the disc driving means 134 to enter the center hole 83 of the disc and the disc to be clamped on the disc driving means 134 by clamping means (not shown, but conventional) and rotated to be scanned by the optical (laser) scanning means 136.

As in the previous embodiments, each disc transfer mechanism includes a partially circular mobile disc support member 36 which rolls without sliding inwardly and outwardly relative to its compartment having, to achieve this end, an arch or rim 38 with a curved outer edge which bears gear teeth 140 meshing with gear teeth 142 on a curved inner edge of a lateral member 144 carried adjacent a side wall 22 of the respective compartment 132. In this case the partially circular disc support member 36 is annular, preferably dish shaped, and extends through a semi-circle so that it supports a disc solely at its peripheral edge and avoids contact with the recorded surface. To hold a disc on the disc support member 36 during transfer operations, the disc support member 36 bears disc retainers 146,148 on two diametrically opposed portions, the disc retainers 146,148 being provided by flexible plastic legs cooperating through conical-shaped fingers 174 with the periphery of a disc to push it against the arch or rim 38 and thus hold the disc against movement due to shock or vibration when in its compartment 132 and during the transfer operations.

Figure 8:
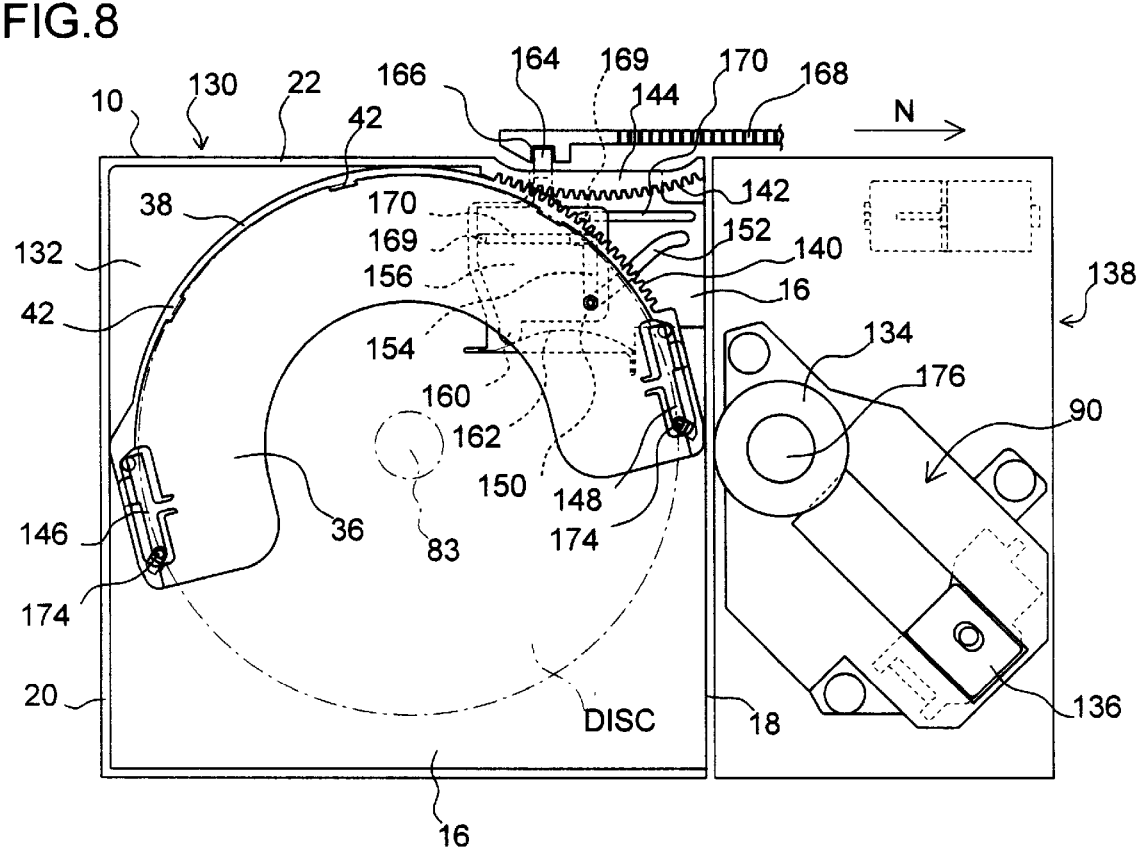
FIG. 8 is a partial top view of a third embodiment of the invention in which the disc transfer mechanism is incorporated in a multiple compartment magazine and combined with a disc player/recorder component to provide a disc changer, more particularly, a CD disc or DVD disc changer and player/recorder, the top cover of the magazine being removed to expose one compartment and a disc and transfer mechanism in storage position, and only those components illustrated which are considered necessary for a full understanding of the invention.
Figure 9:
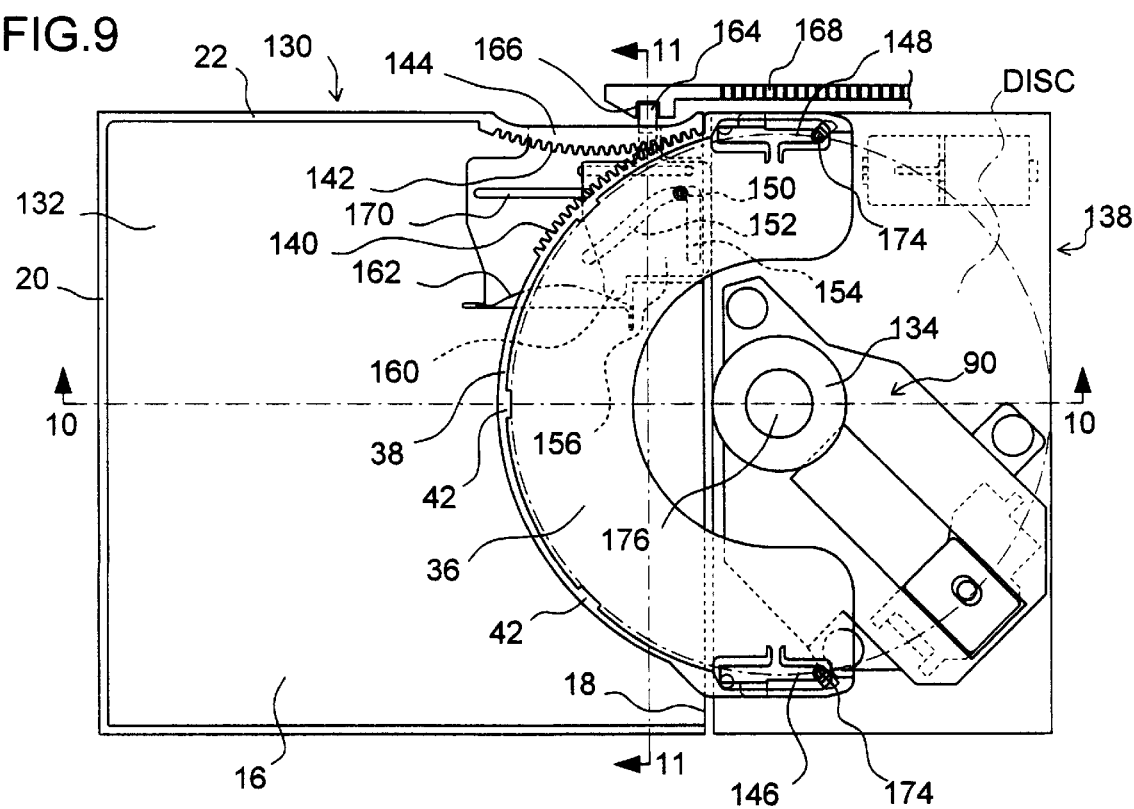
FIG. 9 is similar to FIG. 8 with the disc transfer mechanism and a disc protruding outside the magazine and positioned above the disc driving means of the player/recorder component.

To actuate each disc support member 36 to carry out the transfer operations, each disc support member has fixed to its underside a downwardly projecting stud 150 which extends through both a curved guide slot or groove 152 in a bottom plate or wall 16 of each compartment 132 and an intersecting straight transverse drive slot or groove 154 provided in a lateral slider member 156 which is slidably mounted on the bottom wall 16 for longitudinal movement in the respective compartment 132. To shift the lateral slider member 156 in each compartment 132 by exterior powered means, it has a laterally projecting lug 164 protruding through a suitable opening in the side wall 22 of the magazine housing 10 to fit in a notch 166 of a powered actuator 168 born by the frame 138 when it is in alignment with the front wall 18 of a magazine compartment 132. The lateral slider member 156 also has an extension 160 cooperating with resilient means 162 fixed to the bottom plate or wall 16 of each compartment 132 to provide the lateral slider member 156 with two stable positions, as shown in FIGS. 8 and 9. The lateral slider member 156 is supported and guided in its back and forward linear movements by means such as studs 169 cooperating with slots or grooves 170 provided in the bottom wall 16 of each compartment 132.

Upon forward linear movement of the actuator 168 (in the direction of the arrow N), under power supplied from a player/recorder motor, from the stable position shown in FIG. 8 toward the stable position shown in FIG. 9, the slider member 156 is translated by the actuator 168 which is connected to the slider member 156 via the notch 166 which receives the lug 164 projecting from the slider member 156. Translation of the slider member 156 rotates the disc support member 36 due to the cam action between the transverse drive slot or groove 154 in the slider member 156 and the stud 150 which is fixed to the underside of the disc support member 36 and extends through both the transverse drive slot 154 and the curved guide slot 152 in the bottom wall 16 of the compartment 132 or a housing member providing the bottom wall. As the disc support member 36 rotates it rolls without sliding to transfer a disc outside the compartment 132 to the operative position aligned with the disc driving means 134 of the player/recorder 90 (FIG. 9); further movement of the powered actuator 168 in the direction N (see FIG. 8) translates the slider 139 which powers through the inclined ramps 95 an upward movement of the player/recorder 90, thus of the conical-shaped studs 172 (FIG. 10) which engage the disc retainers 146,148 to force them to pivot to shift the conical-shaped fingers 174 away from the periphery of the disc to release it. Simultaneously, the clamping means (not shown) are operated to clamp the disc on the disc driving means 134 which can then be actuated as the disc is free to rotate.

To insure proper centering of the disc on the disc driving means, the hub 176 of the disc driving means 134 preferably also has a conical profile (FIG. 10) so that when the disc is clamped, upon upward movement of the hub 176, the disc is removed from the rim 38 of the disc support member 36 and its peripheral edge to avoid any contact.

When another disc is selected or playing/recording operations are terminated, the above described procedures are performed in the reverse order, including releasing the disc clamping means of the disc driving means 134 and moving the conical-shaped studs 172 downward to release the disc retainers 146,148 which, by pivoting, shift their conical-shaped fingers 174 toward the periphery of the disc, contact and push it against the rim 38 of the disc support member 36 and lock the disc against movement during disc transfer. Under power supplied from the player/recorder the actuating arm 168 is moved in the reverse direction (opposite to N) which causes the slider member 156 to slide in the same direction and the gear teeth 142 on the slider member 156 to rotate the disc support member 36 to return the disc from the operative position in the player/recorder to a storage position inside the compartment 132. As in the forward transfer, the return transfer of the disc support member 36 is carried out by rolling without sliding, according to the invention.

I claim:

1. Disc apparatus comprising:
   a housing defining a compartment having a side wall; and
   a disc transfer mechanism mounted in the compartment including
      a mobile disc support mounted for rolling movement between inside and outside the compartment to transfer a disc in a transfer plane between entirely inside the compartment and outside wherein a portion of the disc is located outside the compartment, the transfer plane extending through the compartment adjacent the side wall,
      said mobile disc support including a disc support member which supports a disc on the member during transfer and presents on a segment an outer edge which is maintained in rolling contact with and rolls along an inner edge of a longitudinally extending member which is in the transfer plane in the compartment so that both the mobile disc support member and a disc supported thereon rotate and translate as the outer edge of the disc support member rolls along said inner edge of the longitudinally extending member to transfer a disc between inside and outside the compartment.

2. Apparatus according to claim 1 wherein both the outer edge of the disc support member and the inner edge of the longitudinally extending member are curved.

3. Apparatus according to claim 1 further including a resilient member which engages a peripheral portion of the disc and holds another peripheral portion of the disc against elements of the disc support member thereby locating the disc relative thereto.

4. Apparatus according to claim 1 wherein the rolling movement of the mobile disc support is controlled by a cooperating stud and guide surface provided on the disc support member and a member carried by the housing.

5. Apparatus according to claim 4 wherein the guide surface is located on a member carried by the housing which forms a ratchet to lock the disc support member with a disc inside the compartment.

6. Apparatus according to claim 1 wherein the disc support member bears a flexible leg cooperating with a peripheral portion of a disc to occupy two positions serving as an indicator of the presence or absence, respectively, of a disc inside the compartment on the support member.

7. Apparatus according to claim 6 wherein the flexible leg includes a member which projects from a front wall of the compartment when a disc is in the compartment on the disc support member, and retracts when no disc is on the disc support member, and thereby serves as a visual and/or tactile indicator of the presence or absence, respectively, of a disc inside the compartment on the disc support member.

8. Apparatus according to claim 1 wherein a major portion of the disc protrudes from inside the compartment through the front wall when the disc is outside the compartment.

9. Apparatus according to claim 1 wherein the portion of the disc which is located in front of a front wall of the compartment when the disc is outside the compartment comprises the entire disc.

10. Apparatus according to claim 1 wherein the longitudinally extending member is fixed to the side wall of the housing.

11. Apparatus according to claim 1 wherein the longitudinally extending member is on a support slidably mounted in the housing.

12. Apparatus according to claim 1 further including a player/recorder which is mounted to receive a disc transferred by the disc transfer mechanism.

13. Apparatus according to claim 12 wherein the player/recorder is mounted outside the compartment to receive a disc transferred by the disc transfer mechanism from inside to outside the compartment.

14. Apparatus according to claim 13 wherein the disc when inside the compartment is located for storage and when outside the compartment is located for playing/recording by the player/recorder.

15. Apparatus according to claim 12 wherein the player/recorder is mounted inside the compartment to receive a disc transferred by the disc transfer mechanism from outside to inside the compartment.

16. Apparatus according to claim 15 wherein the disc when outside the compartment is located for pick-up/loading and when inside the compartment is located for playing/recording by the player/recorder.

17. Apparatus according to claim 15 wherein the disc transfer mechanism is carried on a drawer slidably mounted on the housing and providing a drawer-type loading/unloading system for the player/recorder inside the compartment to transfer a disc between a loading/pick-up position outside the compartment and an operative position inside the compartment for playing/recording.

18. Apparatus according to claim 16 wherein a powered connection moves the drawer and disc support member under power to transfer a disc between loading/pick-up and operative positions.

19. Apparatus according to claim 18 wherein the powered connection also moves the player/recorder to move the driving means into and out of engagement with the disc in operative position.

20. Apparatus according to claim 12 wherein the player/recorder has a chassis carried for vertical movement to raise and lower driving means of the player/recorder relative to a disc in operative position inside the compartment on the disc support member, to move the driving means into and out of operative engagement with the disc, the disc support member having a dished shape, and upward vertical movement of the driving means into engagement with a disc serving to raise the disc clear of the support member so that it may be rotated without interference with the disc support member.

21. Apparatus according to claim 1 wherein the housing defines a magazine having multiple adjacent compartments with a disc transfer mechanism mounted for rolling movement in each compartment to transfer a disc supported thereby from inside to outside the respective compartments.

22. Apparatus according to claim 21 wherein the multiple compartments in the magazine are arranged one above another, and wherein a player/recorder is mounted for vertical movement relative to the magazine into horizontal alignment with each of the compartments to receive a selected disc transferred by the disc transfer mechanism therefrom.

23. Apparatus according to claim 22 wherein motor driven means is connected to move the player/recorder vertically and to move the disc transfer mechanism in each compartment horizontally to transfer a selected disc when the player/recorder is in horizontal alignment with the compartment.

24. Apparatus according to claim 23 wherein each disc transfer mechanism includes a slider which has a member located outside the respective compartments and is actuated by a member driven by the motor driven means.

25. Apparatus according to claim 22 wherein the player/recorder has a chassis carried for vertical movement to raise and lower driving means of the player/recorder relative to a disc in operative position inside the compartment on the disc support member, to move the driving means into and out of operative engagement with the disc, the disc support member having a dished shape, and upward vertical movement of the driving means into engagement with a disc serving to raise the disc clear of the support member so that it may be rotated without interference with the disc support member.

26. Apparatus according to claim 1 wherein the disc transfer mechanism includes a member which is located outside the compartment and is engageable by an actuator to move the mobile disc support between inside and outside the compartment.

27. Apparatus according to claim 1 wherein the outer edge of the disc support member is curved and the inner edge of the longitudinally extending member is straight.

28. Disc apparatus comprising:
a housing defining a compartment for a disc which has a top and bottom and lateral front, back and side walls;
a disc transfer mechanism in the compartment including,
a mobile disc support mounted for rolling movement to transfer a disc in a transfer plane between an inside position in which a disc supported thereby is entirely within the compartment and an outside position in which a portion of the disc protrudes from inside the compartment through the lateral front wall,
said mobile disc support including a partially circular support member located substantially in the transfer plane and having elements engaged by a peripheral portion of the disc and locating the disc relative to the support member, the support member having a segment presenting a curved outer edge which is maintained in rolling contact with and rolls along an inner edge of a longitudinally extending member which is in the transfer plane so that both the mobile disc support member and a disc supported thereon rotate and translate as a disc is transferred between the inside and outside positions.

29. Apparatus according to claim 28 wherein the partially circular support member comprises a section of a circular member and has a dished shape.

30. Apparatus according to claim 28 wherein a major portion of the disc including its center hole is outside the front wall when the disc is in the outside position.

31. Apparatus according to claim 28 wherein the inner edge of the longitudinally extending member has a curved profile for engagement by the curved outer edge segment of the support member as the mobile disc support is maintained in rolling contact therewith as it moves the disc between the inside and outside positions.

32. Apparatus according to claim 28 wherein the curved outer edge of the segment of the support member and the inner edge of the lateral side wall both have gear teeth which mesh to maintain the members in rolling contact as the mobile disc support moves to transfer the disc between the inside and outside positions.

33. Disc apparatus comprising:
a housing defining a compartment having a side wall; and
a disc transfer mechanism mounted in the compartment including
a mobile disc support mounted for rolling movement between inside and outside the compartment to transfer a disc in a transfer plane between entirely inside the compartment and outside wherein a portion of the disc is located outside the compartment, the transfer plane extending through the compartment,
said mobile disc support including a disc support member which supports a disc on the member during transfer and presents on a segment an outer edge which rolls along an inner edge of a lateral member which is carried adjacent the side wall of the compartment as both the mobile disc support member and a disc supported thereon rotate and translate as the disc support member rolls along said inner edge of the lateral member to transfer a disc between inside and outside the compartment, and wherein the outer edge of the disc support member is curved and maintained in rolling contact with as it rolls along the inner edge of the lateral member by gear teeth on the members which mesh as the mobile disc support rolls to transfer a disc between inside and outside the compartment.

34. Disc apparatus comprising:

housing defining a compartment having a generally parallel top and bottom, and lateral front, back and sides; and a disc transfer mechanism mounted in the compartment including, a mobile disc support supporting a disc and mounted for rolling movement to transfer a disc between an inside position in which the disc is located entirely within the compartment and an outside position in which a portion of the disc is located outside in front of the compartment, said mobile disc support including a partially circular support member which supports a disc for transfer and rolls along an inner edge of a lateral member carried by the housing to transfer a disc between the inside and outside positions, the disc support member being located generally parallel to the compartment top and bottom and including elements locating the disc supported on the support member relative to the support member, the support member having a segment presenting a curved outer edge which bears gear teeth which mesh with gear teeth on said inner edge of a lateral member carried by the housing to maintain the members in rolling contact as the support member rolls along said inner edge which causes both the support member and a disc supported thereon to rotate and translate as the mobile disc support moves to transfer the disc.

35. Disc apparatus comprising:

a housing defining a compartment having generally a bottom and a lateral wall, a disc transfer mechanism mounted in the compartment including, a mobile disc support supporting a disc and mounted for rolling movement to transfer a disc supported thereon between an inside position in which the disc is located entirely within the compartment and an outside position in which a portion of the disc is located outside the compartment, said mobile disc support including a partially circular disc support member extending generally parallel to the bottom wall of the compartment, the disc support member having a segment presenting a curved outer edge which rolls along an inner edge of a lateral member carried by the lateral wall of the housing and bears gear teeth meshing with gear teeth on said inner edge which causes both the disc support member and a disc supported thereon to rotate and translate as the mobile disc support rolls to transfer a disc between its inside and outside positions.

36. Disc apparatus comprising a longitudinally extending guiding surface in a transfer plane which extends between inside and outside the apparatus through a lateral wall of the apparatus, a mobile disc support mounted on said guiding surface for movement in the transfer plane between inside and outside the disc apparatus to transfer a disc supported thereon in the transfer plane between a position inside the apparatus and a position where the disc extends outside the apparatus through said lateral wall, said mobile disc support including a disc support member which presents an outer edge which is maintained in rolling contact with and rolls along an inner edge of said guiding surface which causes both the disc support member and the disc supported thereon to simultaneously rotate and translate in the transfer plane as the disc is transferred between the inside and outside positions.

* * * * *